Sept. 29, 1942.  O. SCHWAGER  2,297,435
FUEL CONSUMPTION INDICATING DEVICE
Filed Dec. 23, 1939
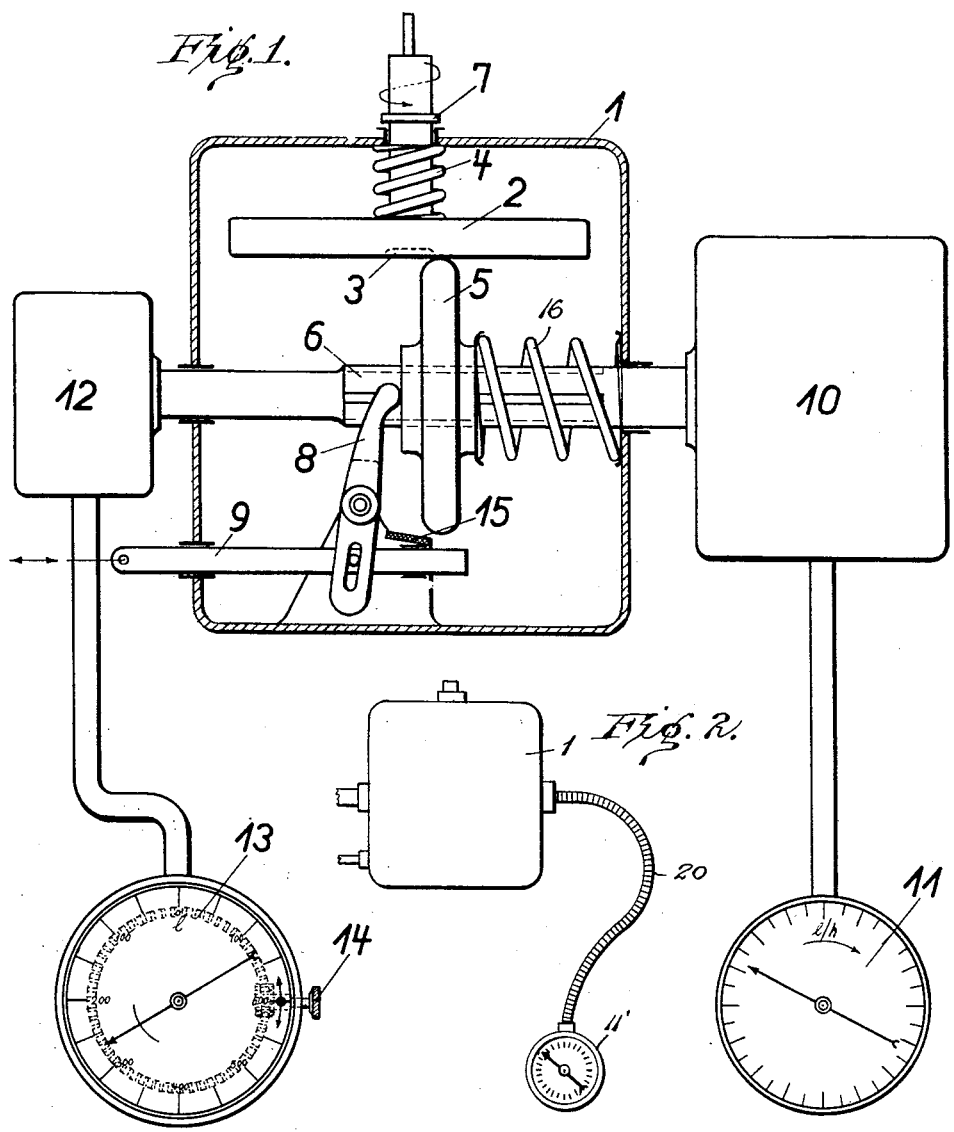
INVENTOR:
OTTO SCHWAGER
by A. A. Hicke
C. Connell Renner Jr.
ATTORNEYS Patented Sept. 29, 1942

2,297,435

UNITED STATES PATENT OFFICE 2,297,435

FUEL CONSUMPTION INDICATING DEVICE

Otto Schwager, Munich, Germany; vested in the Alien Property Custodian

Application December 23, 1939, Serial No. 310,802 In Germany January 5, 1939

11 Claims. (Cl. 73—51)

The invention relates to a device indicating at any time the fuel consumption per unit of time as well as the total fuel consumption of internal combustion engines of the fuel injection type.

The principle of action of the device according to the invention is based on the fact, that the position of the regulating rod of the injection pump is a measure of the quantity of fuel injected during every stroke of the pump, and accordingly the number of revolutions of the pump or of the power engine in connection with the position of the regulating rod is a measure of the fuel quantity injected per unit of time.

The said device essentially comprises an infinitely variable transmission such as a friction gear which is driven by the shaft of the engine or of the injection pump, the driving ratio of said transmission being changed in accordance with the pump delivery adjusted at any time or with the position of the regulating rod of the injection pump in such a manner that said driving ratio is increased with increasing pump delivery; thus the speed of the output shaft of the transmission is a measure of the fuel consumptio per unit of time. The indication in the pilot's cockpit may be effected by means of a flexible shaft or by an electric speed transmitter driven by the transmission output shaft, the indicating device being calibrated in fuel consumption per unit of time.

At the same time the total fuel consumption during the period between starting and stopping the engine is measured according to the invention by counting the total number of revolutions of the output shaft of the transmission.

This may be done by means of an electric counter which is driven by the output shaft of the transmission at such a driving ratio that after a predetermined fuel consumption in gallons the indication of the fuel consumption is transmitted by the closing of a circuit to an indicating device in the pilot's cockpit.

Since for operating an aircraft or a motor vehicle it is more important to know at any time the quantity of fuel in the tank than to be directly advised of the total fuel consumption up to the moment of measurement, the measurement of the total fuel consumption or of the number of revolutions of the transmission output shaft is done preferably in such a manner that by counting the number of revolutions a manually adjustable fuel indication is continuously reduced. For this purpose the indicating device can be provided with a dial which, after replenishing the fuel, is so adjusted that the total quantity of fuel in the tank is indicated, the sense of rotation of the pointer being such that the consumption indication is subtracted from the fuel indication.

These and other features, capabilities and advantages of the invention will appear from the subjoined detailed description of one embodiment and a modification thereof, illustrated in the accompanying drawing, in which:

Fig. 1 is a partially diagrammatic view of the device formed in accordance with the present invention; and Fig. 2 shows the same device for use when the indicator is positioned at a distance from the device itself.

I designates the casing, while the (driving) friction wheel 2 is driven by the engine or the injection pump and has a circular recess 3 in its centre; the spring 4 presses the friction wheel 2 against friction wheel 5 slidably mounted on the splined shaft 6, or in the event of the position of the friction wheel 5 in the recess 3 in the centre of the friction wheel 2, corresponding to the position of non-delivery of the injection pump, the friction wheel 2 is pressed against the stop 7 on its shaft. The friction wheel 5 is displaced against the spring 16 by means of the lever 8 and the linkage 9 proportionately to the movement of the regulating rod of the pump. When the adjustment of the pump is for a larger delivery, the friction wheel 5 moves on the friction wheel 2 more and more outwardly and is thus driven at a progressively increasing driving ratio. The splined shaft 6 on the one hand drives an electric speed transmitter 10 for an indicating device 11 calibrated in fuel consumption per unit of time, and on the other hand the electric counter 12 at such a driving ratio that after a number of revolutions of the shaft 6 corresponding to a fuel consumption of one gallon or fraction this consumption is transmitted to the indicating device 13. The dial of this indicating device is adjustable by means of a button 14 and calibrated in gallons in such a way that the consumption transmitted to the indicating device is subtracted from the fuel contents of the tank adjusted on the dial.

In order to prevent the shaft 6, now becoming free from movement by the wheel 2 in consequence of the adjustment of the pump regulating rod for non-delivery and the central position of the wheel 5 in the recess 3, from being rotated owing to the inertia of the masses driven by said shaft, thus falsifying the consumption indication, a braking device 15 is provided against which the friction wheel 5 is pressed in its centre position.

It is sometimes desirable to place the fuel measuring device at one place, for example, in the vicinity of the engine or the fuel pump, while the indicator itself may be positioned at another place, for example, in the cockpit in the case of an aeroplane. Such an arrangement has been indicated in Fig. 2 in which the variable speed transmission within the casing 1 drives a remotely positioned indicating device 11' through suitable means such as a flexible shaft 20.

The invention is not intended to be limited to the two forms shown, which are to be understood as illustrative only and not as limiting, as various changes in construction and arrangements may be made, all coming within the scope of the claims which follow.

I claim:

1. In a device for measuring the fluid supplied to a prime mover from a source having an adjustable delivery, the combination of an infinitely variable transmission, means directly and solely responsive to the speed of said prime mover for driving said transmission, means variable in accordance with said adjustable delivery for varying the driving ratio of said transmission, and means driven by said transmission for visibly indicating the amount of fluid supplied.

2. The combination according to claim 1, in which said last means is responsive to the speed of said transmission to measure the rate of fluid supplied.

3. The combination according to claim 1, in which said last means is responsive to the number of revolutions of said transmission to measure the total amount of fluid supplied.

4. The combination according to claim 1, in which said transmission comprises a first friction wheel driven in accordance with the speed of said prime mover, a driven shaft connected to the fluid indicating means, and a second friction wheel engaging said first friction wheel and slidably, non-rotatably mounted on said shaft, said second friction wheel being movable in accordance with the variation of the delivery.

5. In a device for measuring the fluid supplied to a prime mover from a source having an adjustable delivery, the combination of an infinitely variable transmission comprising a pair of friction wheels, the annular surface of one of which is movable along the lateral surface of the other, means for driving the other wheel in accordance with the speed of the prime mover, a driven shaft upon which the one wheel is slidably but non-rotatably mounted, means for varying the position of said one wheel in accordance with said adjustable delivery, and means driven by said driven shaft for visibly indicating the amount of fluid supplied.

6. The combination according to claim 5, in which said other wheel is provided with a central recess, whereby movement of the one wheel to the center of the other wheel interrupts the transmission of power to said indicating means.

7. The combination according to claim 5, in which said other wheel is provided with a central recess, whereby movement of the one wheel to the center of the other wheel interrupts the transmission of power to said indicating means, and means for braking said one wheel when it is in the center of the other wheel.

8. The combination according to claim 5, in which said other wheel is provided with a central recess, whereby movement of the one wheel to the center of the other wheel interrupts the transmission of power to said indicating means, and spring means for urging the one wheel to the center of the other wheel.

9. In a device for measuring the fuel supplied to an internal combustion engine of the fuel injection type from a fuel pump having an adjustable delivery, the combination of an infinitely variable transmission driven by and directly responsive to the speed of said engine, means variable in accordance with said adjustable delivery for varying the driving ratio of said transmission, and means driven by said transmission for visibly indicating the amount of fuel consumed by said engine.

10. The combination according to claim 9, in which said last means is responsive to the speed of said transmission to measure the rate of fuel consumption.

11. The combination according to claim 9, in which said last means is responsive to the total number of revolutions of said transmission to measure the total fuel consumption of said engine.

OTTO SCHWAGER.